Oct. 12, 1937.  D. R. HALL  2,095,438

WORK SUPPORT OSCILLATING MECHANISM

Filed May 18, 1935  4 Sheets-Sheet 1

INVENTOR
Donald R. Hall
ATTORNEYS

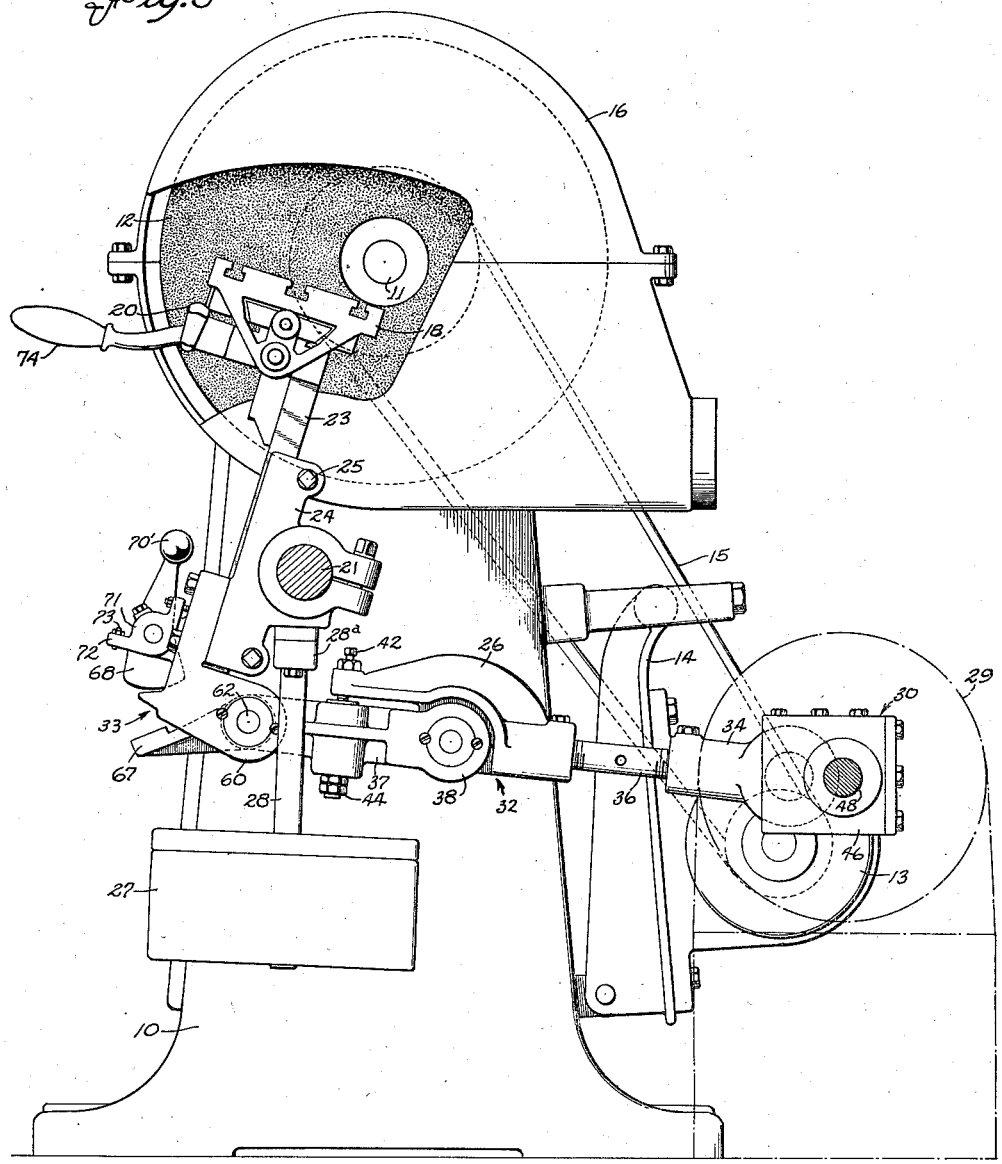

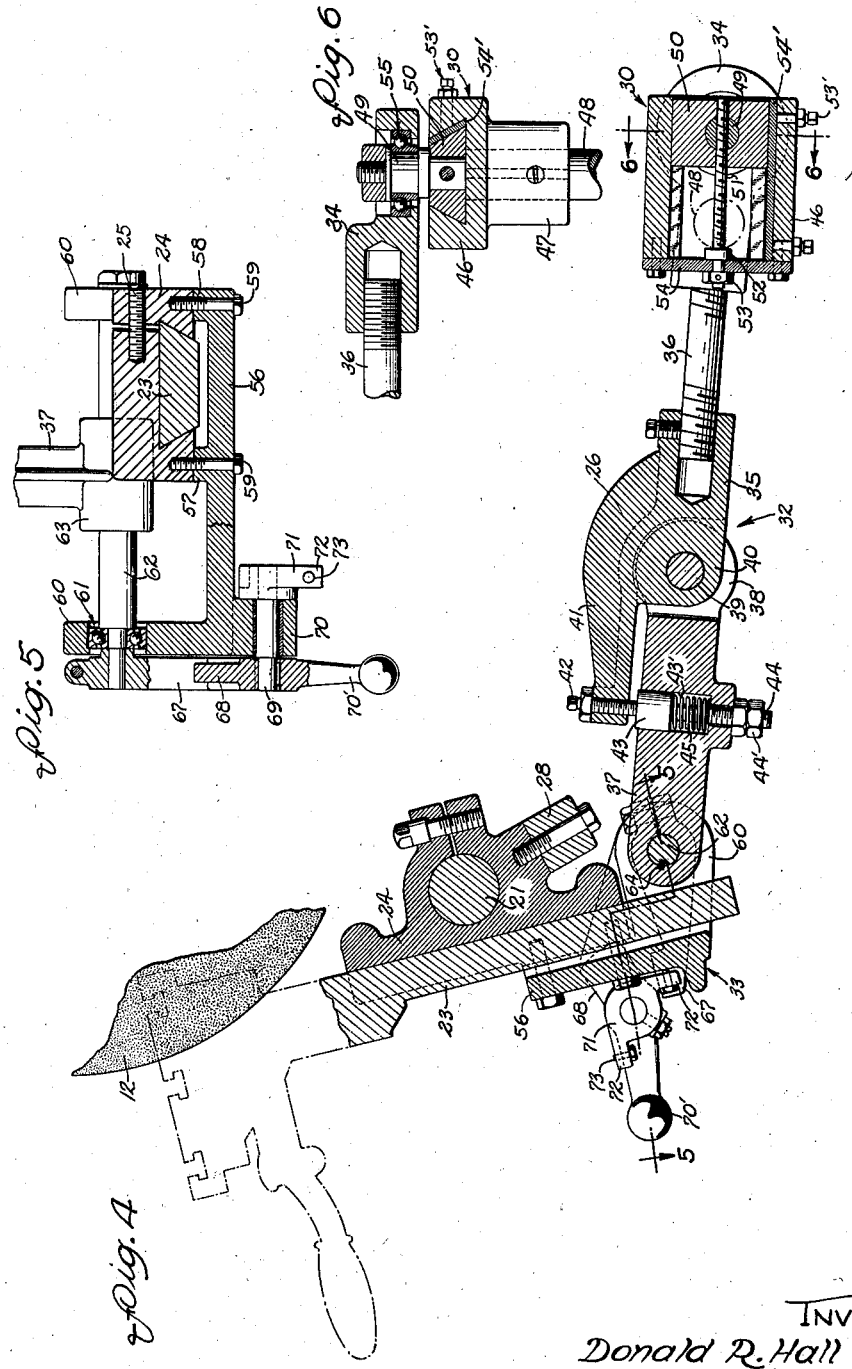

Oct. 12, 1937.   D. R. HALL   2,095,438
WORK SUPPORT OSCILLATING MECHANISM
Filed May 18, 1935   4 Sheets-Sheet 4

INVENTOR
Donald R. Hall
By Parker Carlson,
ATTORNEYS

Patented Oct. 12, 1937

2,095,438

UNITED STATES PATENT OFFICE 2,095,438

WORK SUPPORT OSCILLATING MECHANISM

Donald R. Hall, Beloit, Wis., assignor to Gardner Machine Company, Beloit, Wis., a corporation of Illinois Application May 18, 1935, Serial No. 22,231

16 Claims. (Cl. 51—124)

This invention relates to improvements in machine tools having an oscillatory work support, and has particular reference to the mechanism for oscillating such support.

The primary object of the invention is to provide a novel work oscillating mechanism of an advantageous character which is of simple and rugged construction and which is efficient and dependable in operation.

Another object is to provide a work support power oscillating mechanism having new and improved means whereby the support can be readily engaged with or disengaged from the source of power.

A further object is to provide a novel oscillating mechanism which is adapted to oscillate a work support through a predetermined arc adjacent an operating member or tool of the machine, and which is operable on occasion to swing the support beyond the normal operating range and entirely clear of the tool thereby facilitating mounting and removal of the work.

A more specific object resides in the provision of an oscillating mechanism of the foregoing character which is adapted, when the support is swung beyond its normal operating limit, automatically to disengage the support from the power oscillatory drive.

Another object is to provide work support oscillating mechanism which is readily adjustable so as to vary the throw or travel of the support.

Other objects and advantages of the invention will become apparent from the following detailed description taken in connection with the accompanying drawings in which:

Fig. 3 is an end view similar to Fig. 2 but showing the work table in operating position, and the oscillating mechanism in driving condition.

Fig. 4 is a sectional view of the oscillating mechanism and the work table support.

Fig. 5 is a sectional view taken along the line 5—5 of Fig. 4.

Fig. 6 is a sectional view of the crank eccentric and the sleeve member of the crank connection, the section of the crank eccentric being taken along the line 6—6 of Fig. 4 and that of the sleeve member substantially at right angles to the first section.

For the purpose of illustrating the principles of the invention, the same is shown herein embodied in a disk type grinding machine wherein the work piece is pressed against the abrasive disk or wheel, but it is to be understood that this disclosure is not intended as a limitation of the invention to this particular type of machine tool, it being contemplated that various changes may be made by those skilled in the art to adapt the invention to other types of machine tools without departing from the spirit and scope of the invention as defined by the appended claims.

Figure 1:
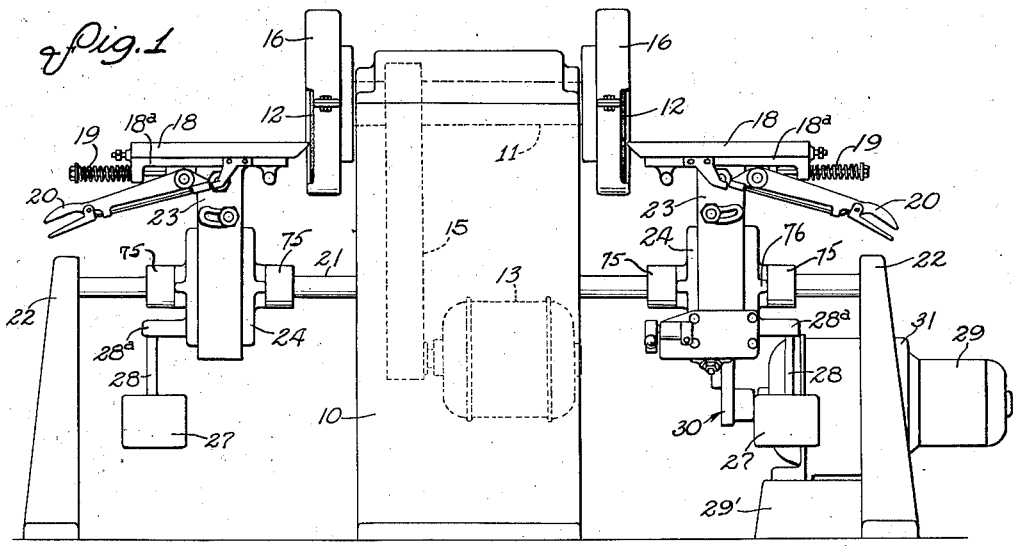
Figure 1 is a front elevational view of a horizontal spindle disk grinder embodying the features of the invention.
Figure 2:
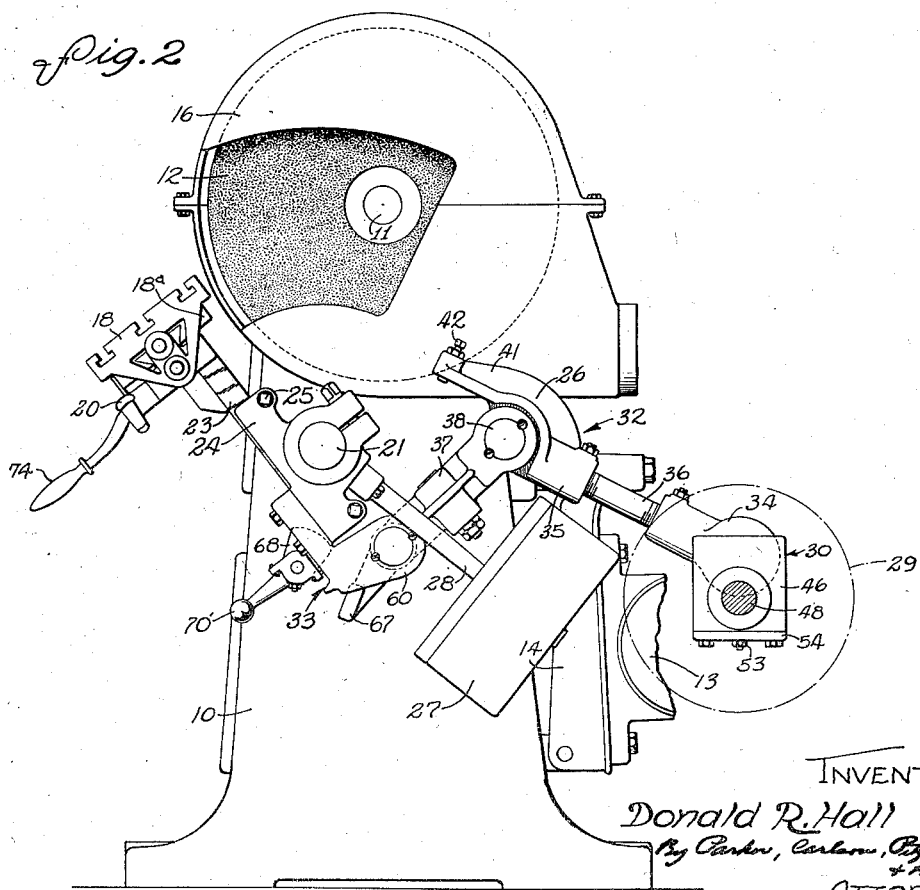
Fig. 2 is an end view of the grinder showing the work table in retracted or loading position, and the oscillating mechanism in non-driving condition.

In the exemplary embodiment shown in Figs. 1, 2 and 3 of the drawings, the grinding machine comprises generally a suitable base 10 upon the upper end of which is rotatively mounted a horizontal arbor or spindle 11 carrying a grinding disk or wheel 12 at either or both ends. The spindle 11 and wheels may be driven from any suitable source of power, for example by a motor 13 mounted on an adjustable bracket 14 on the rear of the base and connected with the spindle by a flexible belt 15. In the present instance, each of the wheels 12 is enclosed in a housing or guard 16, the guard completely enclosing the wheel except for a small space on one side at which a segmental opening in the guard exposes a portion of the wheel face against which the work may be held.

Work may be conveniently supported in operative relation with the face of each grinding wheel 12 by a work support or table 18 which may be of any suitable type, and which is herein shown as slidable on a guide 18ᵃ perpendicular to the face of the wheel, and urged yieldably toward the latter by adjustable compression spring 19 (Fig. 1). Preferably, the top of the table 18 is formed with the usual T-slots as shown in Figs. 2 and 3 by means of which a suitable fixture for the work may be clamped in place. A manually operable hand lever 20 is operatively connected to the table 18, and affords means for retracting the table from the wheel 12 against the action of the spring 19.

The grinding of a work piece on a disk type grinding machine has been found to proceed most satisfactorily when the work is moved back and forth across the face of the grinding wheel. Such movement may be conveniently provided by mounting the work supporting table for oscillation transversely of the axis of the grinding wheel. In the present instance, the table 18 is shown as mounted for oscillation on a rocker member or shaft 21 journaled at one end in the base 10 and at the other end in an outboard bearing 22. The outboard bearing gives the shaft 21 the rigidity which is necessary for accurate work. As shown herein, the guide 18ᵃ for the work table 18 is carried on the upper end of a pedestal 23 adjustably secured by clamping bolts 25 in a dovetailed slideway in a supporting member 24 and the member is fixed on the shaft 21 by a split clamp sleeve. The weight of the table and table mounting may be substantially balanced by a counterweight 27 carried by a depending arm 28 of an offset, outwardly projecting bracket 28ᵃ on the member 24. The table is thus mounted to oscillate in an arc about the axis of the shaft 21 in a plane parallel to the face of the grinding wheel 12.

In the exemplary embodiment, the power driven oscillating mechanism is arranged to oscillate both work supporting tables simultaneously. It will be appreciated, however, that the work tables may be equipped for individual oscillation when desired.

The work table oscillating mechanism consists essentially of a source of power, means for translating the power into oscillatory motion, and means for transmitting this motion to the work table. Power may be supplied from any suitable source such as a motor 29 (Fig. 1) mounted on a suitable base 29' adjacent the base 10. The motor in the present instance is arranged to drive a crank eccentric 30 through a speed reducing mechanism indicated diagrammatically at 31 (Fig. 1). For connecting the eccentric with the work table, a crank connection of novel construction and generally designated by the reference character 32 is provided. One end of the crank connection 32 is operatively connected with the eccentric, and the other end is pivotally connected with a depending bracket 33 (Figs. 2 and 3) carried by the table supporting member 24. Upon rotation of the eccentric 30, oscillatory motion is thus transmitted to the work table supporting means to rock the table about the axis of the pivotal shaft 21.

In order that the work may be readily mounted on or removed from the work table 18, it is desirable to render the oscillatory drive inoperative, and to move the table clear of the grinding element 12. To this end, the connecting rod is provided with a knee type joint 26 intermediate its ends which is adapted to break upwardly to displace the line of thrust from the eccentric 30, and also to shorten the effective distance between the ends of the crank connection, thereby tilting the table outwardly beyond its normal arc of oscillation and entirely clear of the grinding wheel.

In its preferred form as shown in Figs. 2 to 6, inclusive, the crank connection 32 is constructed of two pivotally connected members connected respectively to the eccentric 30 and the work table support bracket 33. The first mentioned member preferably comprises a sleeve member 34 and a joint member 35 rigidly connected together by a cylindrical rod 36. The second mentioned member is formed with a body portion 37 having two spaced ears 38 pivotally connected by a pin 39 to a web 40 on member 35. Preferably, the pivot pin 39 is centered slightly below the longitudinal axes of the respective members, to provide a longitudinally rigid power transmitting connection and prevent the joint from breaking upwardly in operation.

Axial alinement of the two members comprising the crank connection 32 is secured and maintained through the medium of an arm 41 formed on the member 35. The arm 41 is offset from the body portion of the member and projects forwardly to overlie a portion of the member 37. It is thus effective to prevent relative angular movement between the members past dead center in one direction, without interfering with such movement in the other direction. To facilitate accurate alinement of the two members, the arm 41 may be provided with an adjustable set screw 42 adapted to engage an adjustable plunger 43 carried by the member 37. The plunger 43 may conveniently be slidably disposed in a bore 43' in the member 37 and is provided with a shank 44 projecting through a guiding aperture in the bottom of the bore. Nuts 44' provide adjustable means for limiting the upward travel of the plunger. To cushion the shock when the members are brought into alinement, a spring 45 is provided in the bore, and acts against the inner face of the plunger 43. The spring 45 tends to urge the plunger outwardly so that it is engaged by the set screw 42 before the members reach the alined position, thus permitting the members to move into alinement without jar or shock.

The driving connection for the crank 32 includes the eccentric 30 shown in detail in Figs. 4 and 6. As shown herein, the eccentric comprises a rectangular arm 46 eccentrically formed on a sleeve 47 which is adapted to be fixed on a shaft 48 driven by the motor 29. A crank pin 49 is carried on a slide block 50 adjustably mounted in a dovetailed slideway formed longitudinally of the arm. The block 50 may be conveniently adjusted longitudinally of the arm by means of a feed screw 51 held at one end against longitudinal movement by a collar 52 and a nut 53 engaging opposite sides of a cross member 54 on the end of the arm 46, and in threaded engagement at the other end with the block 50 and pin 49. Lateral adjustment is provided by the set screws 53' bearing against the gib 54' in the dovetailed slideway. It will be seen that rotation of the screw 51 will adjust the eccentricity of the pin 49. To provide a connection between the eccentric 30 and the crank connection 32, the crank pin 49 is journaled in a ball bearing 55 in the sleeve member 34. Rotation of the crank arm 46 thus reciprocates the crank connection 32, the travel of the same and incidentally the throw of the work table being determined by the eccentricity of the crank pin 49.

The other end of the crank connection 32 is connected with the work table supporting member through the medium of the bracket 33 which can be attached readily to existing work tables or can be omitted entirely when mechanical oscillation of the table is not required. As shown herein, the bracket comprises a front plate 56 having spaced shoulders 57 and 58 formed on the rear side and adapted to be secured, as by bolts 59, against respective flanges of the channel shaped supporting member 24. The shoulder 58 is formed along one edge and shoulder 57 is formed substantially centrally of the plate so that a substantial portion of the plate projects laterally of the supporting member as shown in detail in Fig. 5. Formed on opposite edges of the plate are a pair of spaced, rearwardly projecting lugs 60 having bearings 61 adapted to support opposite ends of a shaft 62 carried by the connecting rod member 37. The shaft 62 is slidably journaled in a sleeve 63 on the end of member 37, and is rigidly secured against rotation therein by a key 64 (Fig. 4). The slidable mounting provides for lateral adjustment of the work support to compensate for grinding wheel wear.

The shaft 62, by reason of its rigid connection with the member 37 is rocked in the bearings 61 incident to the reciprocation of the crank connection 32. This rocking action may desirably be employed in effecting the folding or breaking of the joint 26 to disengage the work table from the source of power thereby requiring a minimum of effort on the part of the attendant. To this end, a lever member 67 may be rigidly secured to the projecting end of the shaft 62 so as to extend forwardly beyond the end of member 37, and preferably substantially in the same plane as the axes of the crank connection members. During the normal reciprocation of the crank 32, the end of the member 67 accordingly describes an arc relative to the table supporting member between the limit positions shown in Figs. 3 and 4, respectively.

Mounted on the bracket 33 for coaction with the lever 67 is a cam 68 adapted to be moved into or out of the path of the lever. As shown, the cam 68 is fast on one end of a shaft 69 which is journaled in a lug 70 projecting from the front of the bracket plate 56. A hand lever 70' affords means for rocking the cam 68 through an angle of approximately ninety degrees. The limiting positions of the cam are defined by a stop member 71 fast on the shaft 69 and provided with peripherally spaced arms 72 adapted to engage the plate 56 in alternate extreme positions of the cam. Set screws 73 carried by the arms 72 provide means for accurate adjustment of these limit positions.

When the lever 70' is moved by gravity into its lowermost position as shown in Fig. 4, the cam 68 is lifted out of the path of lever 67 so that the crank connection 32 may reciprocate in the normal manner to oscillate the work table. Movement of the lever 70' into its upper position, as shown in Fig. 3, interposes the cam in the path of the lever. Accordingly, in the next rearward stroke of the crank connection, the outer end of the lever 67 will be forced downwardly by engagement with the cam, and, by reason of its fast connection thereto, rock the shaft 62 and the link 37 to break the joint 26 upwardly, thereby interrupting the direct line of thrust from the eccentric 30 through the crank 32 to the member 33. The member 36 will continue to reciprocate but, as the crank connection is no longer rigid throughout its entire length, no movement will be imparted to the work table and the member 37 will simply rock about the axis of the shaft 62. In this position, the effective length of the crank connection obviously will be reduced, and the work table will be tilted out beyond its operative arc, and entirely clear of the grinding element as shown in Fig. 2. To insure against the table tilting too far, one of the collars 75 which holds the work support in position upon the shaft 62 may be provided with a suitable offset or lug to coact with a complementary offset 76 formed on the supporting member 24.

After the work has been mounted on the table 18, which may be done readily while the table is tilted outwardly and in retracted position, the grinding operation of the machine may be reinstituted by rotating the table support in a clockwise direction as viewed in Fig. 2, until the crank connection members are axially alined, thus shifting the table 18 into operative relation to wheel 12. Spring 19 is then released by means of the hand lever 20 and automatically feeds the table and work to the operating face of the wheel 12. A hand lever 74 provides a convenient means for rotating the table support, which is done, of course, with the cam 68 rotated out of the path of the lever 67.

Figure 7:
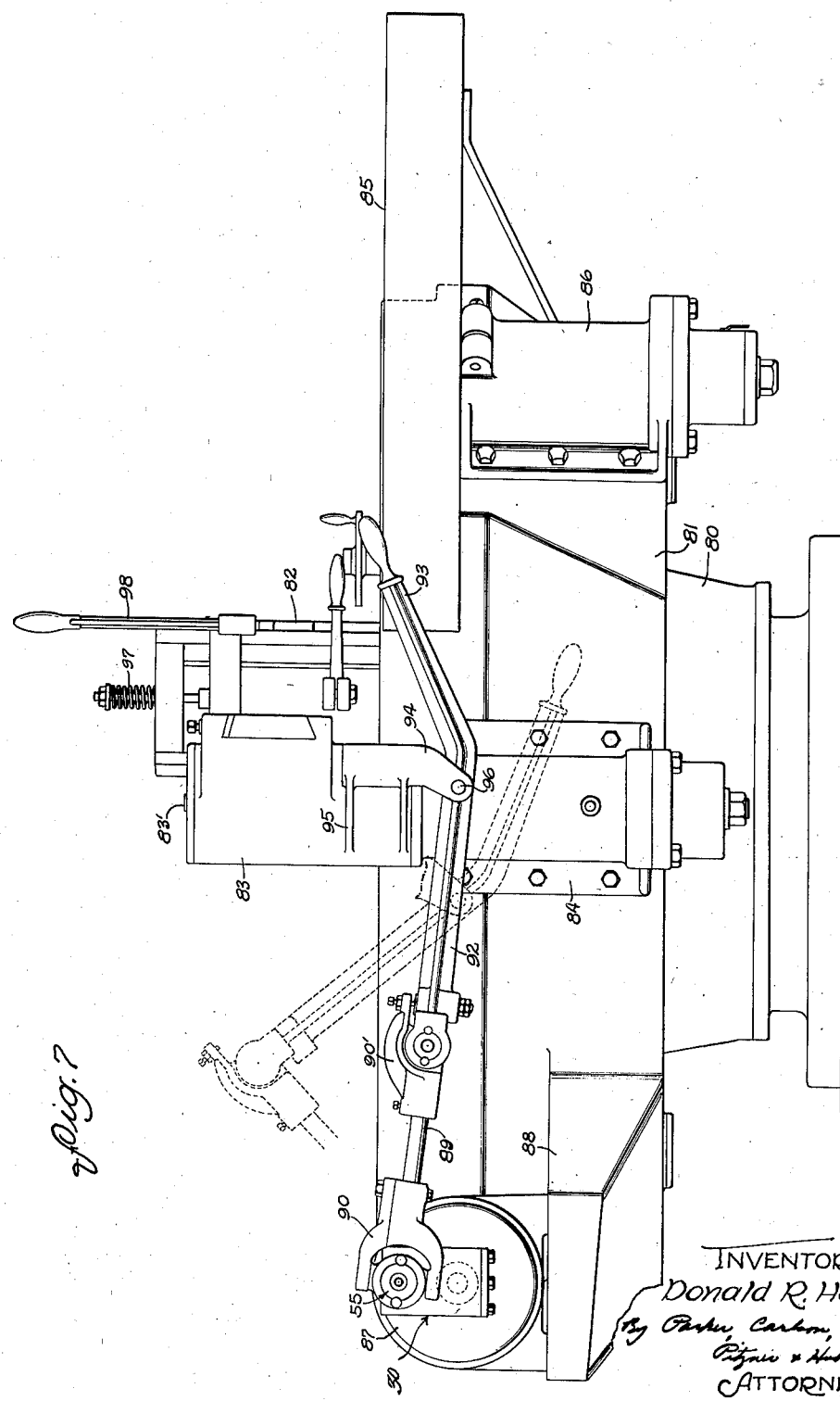
Fig. 7 is a front elevational view of a vertical spindle disk grinder embodying a modified form of the invention.

The application of the improved work table oscillating mechanism to a vertical spindle type disk grinder is shown in Fig. 7. The grinder illustrated may be of any well known type comprising a suitable base 80 supporting a cylindrical frame 81 which encloses a horizontally disposed grinding disk or wheel. A work table 82 of any suitable type may be supported with its work face in a substantially vertical plane by a table support member 83 pivoted for oscillation in a plane parallel to the face of the grinding disk. The pivotal support 83 may comprise a shaft 83' journaled in a bracket 84 on the frame 81. An auxiliary table 85 to facilitate the mounting of the work on the table 82 may also be provided and this may conveniently be carried on a bracket 86 secured to one side of the frame 81. The auxiliary table 85 is preferably so positioned that the work table 82 may be swung out over it and may desirably be provided with means for vertical adjustment.

As shown herein, the source of power for oscillating the work supporting table is a motor 87 mounted on an outwardly projecting platform 88 formed integrally with or rigidly secured to the frame 81. The motor oscillates the table through the medium of the eccentric crank arm 30 and a crank connection 89 generally similar to and functioning in substantially the same manner as the crank connection 32 hereinbefore described. In this case however, a bifurcated sleeve member 90 of the connecting rod is provided with a bearing 55 pivotally supported in the forked end of the member to receive the crank pin of the crank arm 30 and thus provide a universal joint between the crank 89 and crank arm. This connection permits the connecting rod to assume various angles with respect to the axis of the shaft of the driving motor 87 which, in the present instance, is substantially perpendicular to the pivotal axis of the work table supporting member 83. The purpose and advantages of this type of connection will appear as the description proceeds.

The crank connection in the embodiment under discussion is provided with a joint 99' which is identical with the joint 26 hereinbefore described. The outer member 92 of the crank 89, however, differs from the link 37 in that it is provided with an extension 93 which constitutes a manually operable member for forcing the crank connection members out of alinement to disengage the work table from the driving means. Connection between the table support 83 and the crank 89 is provided in the present instance by a connecting member 94 which is supported for rotation on a substantially vertical axis by a bracket 95 projecting laterally from the member 83. Member 94 may be provided with depending ears spaced to receive the link 92 which is secured between them by a pivot pin 96.

As shown in the drawings, the crank connection members are in axial alinement and the crank 89 is effective to oscillate the work table incident to the rotation of the crank eccentric 30. Work mounted on the table 82 is thereby passed back and forth across the grinding wheel, being forced against the wheel by a spring 97. To retract the work from the grinding wheel, the manual lever 98 may be actuated to raise the table 82 against the force of the spring 97. Oscillation of the table may then be interrupted by depressing the lever 93. Member 92 is thereby rocked about the axis of the pivot pin 96, and thrown out of axial alinement with its companion driving member by the breaking of the knee joint as before described. As the effective length of the connecting rod is shortened, table 82 swings outwardly toward auxiliary table 85. By reason of the eccentric position of the connecting member 94 with respect to the pivotal axis of the table support, the crank 89 is displaced from its normal vertical plane, being forced inwardly or toward the machine as it approaches the position shown in dotted line. This displacement is made possible by the universal joint connection to the crank eccentric as hereinbefore explained. When the work table has been moved to its extreme outward or loading position, the crank 89 will attain the position indicated in dotted lines. The driving member of the crank will continue to reciprocate but member 92 will simply rock about the axis of the pivot pin 96 and no movement will be imparted to the work table. To resume grinding operations, the lever 93 is simply raised until the two members are axially alined and the crank connection is rendered effective to oscillate the work table.

In operating the machine tool embodying the features of the invention, work is loaded on the work supporting table 18 while the same is held stationary in the extreme outer or loading position as shown in Fig. 2. When the work is in place, the lower end of the table supporting pedestal is moved forwardly by means of the hand lever 74. Lever 70' in the meantime will have shifted into its lower position as shown, thereby rocking the cam 68 out of the path of the lever 67. As the lower end of the pedestal moves forward, table 18 moves toward the grinding wheel 12 and the effective distance between the pedestal and the eccentric is increased. The angle between the crank connection members, which are bent at the joint as shown in Fig. 2, is correspondingly reduced and the members approach the position of axial alinement shown in Fig. 4. Just before this alined position is reached, the set screw 42 carried by arm 41 engages the yieldably supported plunger 43 carried by the member 37, and the members fall into axial alinement with substantially no jarring or shock. In this position, the crank connection is rigid throughout its length with respect to longitudinal thrust and is effective to transmit the motion of eccentric 30 to the table supporting pedestal and table. The work supported on the table is thereby oscillated across the face of grinding wheel 12 and in operative relation therewith. The arc through which the table oscillates, that is, the throw of the table depends upon the eccentricity of the crank pin 49 with respect to the axis of the crank arm 46. This may be adjusted as required so that the work supported by the table 18 will be passed back and forth across the face of the grinding wheel 12 in a manner such as to give the best results.

When the grinding operation has been completed and it is desired to remove the work from the work supporting table, the hand lever 70' is shifted to its upper position as shown in Fig. 3. Cam 68 is thereby rocked into the path of lever 67 so that on the next rearward stroke of the crank connection 32, the cam will engage lever 67 and rock the lever and the shaft 62. As both lever 67 and member 37 are rigid with the shaft, member 37 will also rock about the axis of the shaft and the two members of the crank 32 will pivot relative to each other on the pivot pin 39. Axial alinement of the crank connection members is thereby interrupted and the members shift to the position shown in Fig. 2. In this position, the driving member 36 will continue to reciprocate incident to the rotation of the eccentric 30 and this reciprocation will rock the member 37 about the axis of the shaft 62. No movement will be imparted to the work table, however, which will remain stationary and, due to the shortening of the effective length of the crank connection, will tilt out beyond its normal oscillating range into the position shown in Fig. 2. The work may then be conveniently removed from the table and new work loaded thereon for the next operating cycle.

The operation of the machine shown in Fig. 7 is substantially the same as that above described. Work is loaded on the table 82 while the table is held stationary over the auxiliary table 85 with the crank 89 in the position shown in dotted line. When the table is suitably loaded, the manual lever 93 may be raised until the two members of the crank connection are axially alined. The raising of the lever 93 causes the work table to swing inwardly into operative relation with the grinding wheel and the table is oscillated in this relation by the eccentric 30 acting through crank 89.

Upon the completion of the grinding operation, oscillation of the table 82 may be interrupted and the table swung out to loading position by depressing the manual lever 93. This throws the crank connection members out of axial alinement and causes the table 82 to swing outwardly toward the loading position. The driving member will continue to reciprocate incident to the rotation of the eccentric 30 but the member 93 will simply rock about the axis of the pivot pin 96 without imparting movement to the work table. Loading or unloading of the work table may then proceed.

From the foregoing it will be apparent that I have produced a work table oscillating mechanism of advantageous character which is simple and rugged in construction, and which provides a very efficient and dependable means by which the work table can readily be engaged with and disengaged from the source of power for oscillating the same. Moreover, the oscillating mechanism, while effective to oscillate the table through a predetermined arc relative to the face of the tool or operating element of the machine, is readily operable to swing the table beyond its normal operating arc and entirely clear of the tool and at the same time disengaging the table from the driving means thereby interrupting the oscillatory movement and positioning the table so that work may be placed thereon or removed therefrom with ease and dispatch.

I claim as my invention:

1. A grinding machine having, in combination, a grinding wheel, means for supporting work in operative relation to the face of said wheel, means for oscillating said supporting means on an axis substantially parallel to the axis of the wheel, a driven eccentric, a crank connection comprising two pivotally connected members connecting said eccentric with said supporting means, and means for maintaining said members in axial alinement to oscillate said supporting means under control of said eccentric.

2. A grinding machine having, in combination, a grinding wheel, means for supporting work in operative relation with the face of said wheel including a work supporting table adapted to be oscillated about an axis substantially parallel to the axis of the wheel, a driven eccentric, a crank connection comprising two pivotally connected members connecting said eccentric with said supporting means, means for alining said members axially to oscillate said table under control of said eccentric, and means for rocking said members on their common pivot to interrupt their axial alinement and thereby stop the oscillation of said table.

3. A grinding machine having, in combination, a grinding wheel, a work support adapted to be oscillated about an axis substantially parallel to the axis of the wheel, a driven eccentric, a crank connection comprising two members pivotally connected together at adjacent ends, the first of said members being connected at its other end to said eccentric, the second of said members being connected at its other end to the work support, a lever member rigidly secured to the end of the second member, means for axially alining the members to oscillate said work support under control of said eccentric, and means including a cam member carried by said work support and engageable with said lever member to rock the members on their common pivot thereby interrupting their axial alinement and stopping the oscillation of the work support.

4. A grinding machine having, in combination, a grinding wheel, means for supporting work to be operated on by the face of said wheel, and means operative to oscillate said supporting means through a predetermined arc adjacent said wheel and on occasion, to interrupt the oscillation and to swing the supporting means to a loading position beyond the limits of said arc, said last means including a driven eccentric and a jointed crank connection operatively connected between said eccentric and the supporting means.

5. A grinding machine having, in combination, a grinding wheel, means for supporting work in operative relation to said wheel, means for oscillating said supporting means through an arc across the face of the wheel to cause the wheel to operate upon the work, and means for swinging said supporting means beyond the limits of the operating arc to a loading position, said oscillating means including an eccentric and a jointed crank connection connecting the eccentric with the supporting means, said swinging means including means for breaking the joint of said crank connection to displace the same from the line of thrust of the eccentric.

6. A machine tool having, in combination, a rotatable tool, means for supporting work in operative relation to said tool, means for oscillating said supporting means about an axis substantially parallel to the axis of the tool, a driven eccentric, and a sectional crank connection continuously interposed between the eccentric and the supporting means and effective to oscillate the supporting means incident to the rotation of the eccentric when the sections thereof are disposed in a predetermined position one relative to the other and to interrupt the oscillation thereof when the relative position of the sections is altered.

7. A machine tool having, in combination, a rotatable tool, means for supporting work in operative relation to said tool, means for oscillating said supporting means about an axis substantially parallel to the axis of the tool, to move the work back and forth across the face of the tool, a crank arm, means for rotating the arm, a crank pin eccentrically mounted on the crank arm, a crank connection continuously interposed between said crank pin and said supporting means, and means for rendering said crank connection effective or ineffective to oscillate said member incident to the rotation of said crank arm, said means comprising a joint intermediate the ends of the crank connection whereby the ends thereof may be moved into or out of axial alinement.

8. A machine tool having, in combination, a rotatable tool element, a work support mounted for oscillatory movement relative to the tool element, a motor for oscillating said support, and means drivingly connecting said motor and said support, said means including a crank connection continuously interposed between said motor and said support and adapted to assume either an axially rigid condition or a non-rigid condition.

9. A machine tool having, in combination, a rotatable tool element, a work support mounted for oscillatory movement relative to the tool element, a driven eccentric for oscillating said support, and means disengageably connecting said eccentric and said support, said means including a normally rigid crank connection continuously interposed between the support and the eccentric and having a joint whereby the same may be displaced from the line of thrust of the eccentric to interrupt the oscillation of the support by the eccentric.

10. A mechanism for transmitting power from a driven eccentric to an oscillatory work support comprising, in combination, a crank connection having an elongated member with a bearing at one end seating on the eccentric, an off-set arm projecting forwardly from the other end of the member and extending substantially beyond the same, a second elongated member with a bearing at one end, said bearing seating a shaft carried by the work support, a pivot pin connecting the free end of said first member with one end of said second member whereby said off-set arm overlies a portion of said first member, and adjustable means carried by said arm and engageable with said second member to axially aline the members.

11. A mechanism for transmitting power from a driven eccentric to an oscillatory work support comprising, in combination, a crank connection having an elongated member with a bearing at one end seating on said eccentric, an off-set arm projecting forwardly over the other end of the member and extending substantially beyond the same, a second elongated member with a bearing at one end, said bearing seating a shaft carried by the work support, a pivot pin connecting the free end of said first member with one end of said second member whereby said off-set arm overlies a portion of said first member axially alining the same and effectively limiting the extent of relative pivotal movement between the members, and means engageable by the other end of said second member to effect a relative pivotal movement between the members and interrupt the axial alinement thereof.

12. A mechanism for oscillating a work support carried on the upper end of a pedestal pivotally supported intermediate its ends comprising, in combination, a driven crank arm, a crank pin eccentrically mounted on said crank arm, an elongated crank member having a bearing at one end for said crank pin, a second elongated crank member pivotally connected at one end to the free end of said first member and at the other end to the lower end of the support pedestal, coacting means of said members for alining the members coaxially to enable the same to impart the movement of the crank arm to the pedestal and work support and for limiting the relative pivotal movement of the members to one direction from the position of axial alinement, a lever member rigidly secured to the end of said second member connected with the pedestal and disposed to project beyond the point of connection, and a cam member mounted on the pedestal and adapted to engage said lever member to effect a relative movement of the members out of axial alinement and thereby prevent the connecting rod from imparting movement to the pedestal and support.

13. A mechanism for oscillating a work holding table mounted on a pivoted supporting member comprising, in combination, a crank arm, a motor for rotating said arm, a crank pin eccentrically mounted on the crank arm, a shaft journaled in the work table supporting member, a crank connection connecting between said crank pin and said shaft, said crank having a joint intermediate its ends permitting the two ends of the crank to assume a position of axial alinement wherein the crank is rigid throughout its entire length and effective to impart oscillating movement to the work table incident to the rotation of said crank arm and permitting the relative movement of the two ends of the crank out of axial alinement wherein no movement is imparted to the work table by the rotation of said crank arm.

14. A mechanism for oscillating a work holding table carried on a pivoted supporting member comprising, a driven eccentric, a crank connection connecting between said eccentric and the table supporting member, said crank having a joint intermediate its ends to enable the end portions thereof to assume a position of approximate axial alinement wherein the crank is effective to oscillate the table through a predetermined arc under control of the eccentric, and means for breaking said joint to shift the ends of the crank out of axial alinement and thereby interrupt the oscillation of the table and to swing the table beyond the limit of its arc of oscillation.

15. A mechanism for oscillating a work support in operative relation with a rotatable tool comprising, in combination, a crank connection having a joint intermediate its ends permitting relative movement of the two ends thereof into or out of axial alinement, a shaft carried at one end of the crank connection for providing a permanent pivotal connection to the work support, a bearing carried on the other end of the crank connection, a crank pin journaled in said bearing, a rotatable crank arm supporting said crank pin, and means on said arm coacting with said pin to vary the position of the pin with respect to the axis of rotation of the crank arm and thereby regulate the movement imparted to the crank connection by the rotation of the crank arm.

16. A machine tool having, in combination, a base, a tool rotatably mounted on the base, an elongated supporting member mounted on the base with its longitudinal axis substantially parallel to the axis of said tool, a pedestal supported intermediate its ends upon said member and having its ends extending substantially beyond and on opposite sides of the axis of the member, said pedestal being arranged for oscillatory movement transversely of the axis of the supporting member, a work table mounted on one end of the pedestal for movement relative to said tool in the oscillation of said pedestal, a driven eccentric, and a crank connection interposed between said eccentric and the other end of said pedestal for oscillating the same, said crank connection having a hinge joint intermediate its ends whereby the oscillation of said pedestal may be interrupted without disconnecting the crank connection from the eccentric or the pedestal.

DONALD R. HALL.